United States Patent [19]
Knight et al.

[11] Patent Number: 5,364,897
[45] Date of Patent: Nov. 15, 1994

[54] URETONIMINE-MODIFIED EMULSIFIABLE POLYISOCYANATE COMPOSITIONS

[75] Inventors: Ann E. Knight, Antwerpen; Godelieve Bourbon, Rotselaar, both of

[73] Assignee: Imperial Chemical Industries PLC, London, England

[21] Appl. No.: 890,738

[22] Filed: May 28, 1992

[30] Foreign Application Priority Data

May 29, 1991 [GB] United Kingdom ............ 9111559.2

[51] Int. Cl.$^5$ .............. C08L 75/04; C08L 33/00; C08L 63/00; C08K 3/20
[52] U.S. Cl. ................... 524/457; 426/579; 523/402; 523/404; 524/501; 524/507; 560/330
[58] Field of Search ............. 560/330; 524/457; 523/404; 426/579

[56] References Cited

U.S. PATENT DOCUMENTS

| | | | |
|---|---|---|---|
| 4,505,778 | 3/1985 | Robertson, I | 162/135 |
| 4,663,177 | 5/1987 | Weaver et al. | 426/579 |
| 4,892,897 | 1/1990 | Redman | 523/404 |
| 4,927,876 | 5/1990 | Coogan et al. | 524/457 |

FOREIGN PATENT DOCUMENTS

| | | | |
|---|---|---|---|
| 0095594 | 12/1983 | European Pat. Off. | 523/404 |
| 0310345 | 4/1989 | European Pat. Off. | 523/404 |
| 1444933 | 8/1976 | United Kingdom | 524/457 |
| 2018796 | 10/1979 | United Kingdom | 523/404 |

*Primary Examiner*—Floyd D. Higel

[57] ABSTRACT

The invention provides polyisocyanate compositions having a uretonimine-modified isocyanate content of from 4% to 75% by weight, calculated on the whole composition, comprising a uretonimine-modified polyisocyanate and a non-ionic surface-active agent devoid of hydroxy, amino and carboxylic acid groups, and aqueous emulsions thereof having improved stability and pot-life.

18 Claims, No Drawings

URETONIMINE-MODIFIED EMULSIFIABLE POLYISOCYANATE COMPOSITIONS

The present invention is concerned with a novel polyisocyanate composition which is emulsifiable and with aqueous emulsions comprising such a polyisocyanate composition.

Emulsifiable polyisocyanates and aqueous emulsions comprising such polyisocyanates have been described in UK Patent No. 1444933. Although these emulsions have been used commercially quite satisfactorily there remained room for improvement especially regarding the stability and the pot-life of such emulsions.

Surprisingly it has been found that the stability and the pot-life can be improved by employing a uretonimine-modified emulsifiable polyisocyanate.

Therefore the invention is concerned with a polyisocyanate composition having a uretonimine-modified isocyanate content of from 4% to 75% by weight, comprising a uretonimine-modified polyisocyanate and a non-ionic, surface-active agent devoid of hydroxy, amino and carboxylic acid groups. In a further aspect, the invention provides an aqueous emulsion comprising water and a polyisocyanate composition as hereinbefore described.

The polyisocyanate composition according to the present invention is preferably made by modifying a polyisocyanate in such a way that a uretonimine-modified polyisocyanate is obtained and subsequently reacting this uretonimine-modified polyisocyanate with a compound which yields after having reacted with the polyisocyanate a non-ionic, surface-active agent devoid of hydroxy, amino and carboxylic acid groups. The polyisocyanate composition according to the present invention may also be prepared by conducting the above two reaction steps in the opposite order.

A further method of preparing the polyisocyanate composition according to the present invention comprises preparation of a uretonimine-modified polyisocyanate followed by addition of a non-ionic, surface-active agent devoid of hydroxy, amino and carboxylic acid groups.

Processes for preparing uretonimine-modified polyisocyanates are generally known in the art and as such do not form part of the present invention.

A process for preparing a non-ionic, surface-active agent devoid of hydroxy, amino and carboxylic acid groups has been described in UK Patent No. 1444933.

The polyisocyanate starting material may be selected from aliphatic isocyanates such as hexamethylene diisocyanate, aromatic isocyanates such as m- and p-phenylene diisocyanate, tolylene-2,4- and -2,6-diisocyanates, diphenylmethane-4,4'-diisocyanate, diphenylmethane-2,4'-diisocyanate, chlorophenylene-2,4- diisocyanate, naphthylene-1,5-diisocyanate, diphenylene-4,4'-diisocyanate, 4,4'-diisocyanate-3,3'-dimethyldiphenyl, 3-methyl-diphenylmethane-4,4'-diisocyanate and diphenyl ether diisocyanate, cycloaliphatic diisocyanates such as cyclohexane-2,4- and 2,3-diisocyanates, 1-methyl cyclohexyl-2,4- and 2,6-diisocyanates and mixtures thereof and bis-(isocyanatocyclohexyl)-methane and triisocyanates, such as 2,4,6-triisocyanatotoluene and 2,4,4'-triisocyanatodiphenyl ether.

There may be present mixtures of isocyanates, for example a mixture of tolylene diisocyanate isomers such as commercially available mixtures of 2,4- and 2,6-isomers and also the mixture of di- and higher poly-isocyanates produced by phosgenation of aniline/formaldehyde condensates. Such mixtures are well-known in the art and include the crude phosgenation products containing mixtures of methylene bridged polyphenyl polyisocyanates, including diisocyanate, triisocyanate and higher polyisocyanates together with any phosgenation by-products.

Preferred compositions of the present invention are those wherein the isocyanate is an aromatic diisocyanate or an aromatic polyisocyanate of higher functionality, in particular diphenylmethane diisocyanate and crude mixtures of methylene bridged polyphenyl polyisocyanates containing diisocyanates, triisocyanates and higher functionality polyisocyanates. Methylene bridged polyphenyl polyisocyanates are well known in the art and have the generic formula

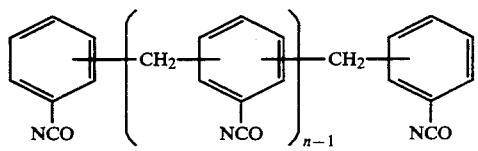

where n is one or more and in the case of the crude mixtures represents an average of more than one. They are prepared by phosgenation of corresponding mixtures of polyamines obtained by condensation of aniline and formaldehyde.

The most preferred polyisocyanates are diphenylmethane-4,4'-diisocyanate (4,4'-MDI) and diphenylmethane-2,4'-diisocyanate (2,4'-MDI) and isomer mixtures thereof, especially those mixtures containing a high amount of 2,4'-isomer. Polyisocyanate mixtures of diphenylmethane-4,4'-diisocyanate and diphenylmethane-2,4'-diisocyanate for use in the compositions of the invention contain preferably at least 15% of the 2,4'-isomer, and most preferably from 15% to 40% thereof.

Other isocyanates which can be present in the emulsions of the present invention include isocyanate-ended prepolymers made by reaction of an excess of a diisocyanate or higher functionality polyisocyanate with a hydroxyl-ended polyester or hydroxyl-ended polyether and products obtained by reacting an excess of diisocyanate or higher functionality polyisocyanate with a monomeric polyol or mixture of monomeric polyols such as ethylene glycol, trimethylol propane or butane-diol.

After the polyisocyanate starting-material has been converted into a uretonimine-modified polyisocyanate, unmodified polyisocyanate may be added to this uretonimine-modified polyisocyanate if desired.

The amount of uretonimine-modified isocyanate in the polyisocyanate composition according to the present invention is from 4% to 75% and preferably from 5% to 50% by weight calculated on the whole composition.

The NCO content of the polyisocyanate composition according to the present invention may range from 20% to 32% and preferably 25% to 32% by weight, calculated on the whole composition.

The non-ionic, surface-active agent devoid of hydroxy, amino and carboxylic acid groups may be any such agents, and in particular may be condensates containing chains of alkylene oxide, especially ethylene oxide, molecules and no free chain end hydroxy, amino or carboxylic acid group. These include for example condensates of alkyl phenols, long chain alcohols and amides with alkylene oxide especially ethylene oxide, the end hydroxy group being for example etherified or esterified.

Of particular value are the reaction products of diisocyanates and higher functionality polyisocyanates with monoalkyl ethers of polyethylene glycols as described in British Patent Specification No. 1417618. These particular surface-active agents or emulsifying agents have the formula $$RO(CH_2CH_2O)_nCONHX$$

wherein R is an alkyl group of from 1 to 4 carbon atoms, n is an integer such that the compound contains an average of at least 5 oxyethylene groups and X is the residue of a di- or polyisocyanate and contains at least one free isocyanate group. Examples of R include ethyl, propyl and butyl, preferably methyl. It is preferred that n represents an average of from 5 to 120.

The group X is the residue which would remain after one isocyanate group has been removed. The group X may be the residue of any diisocyanate or higher polyisocyanate and, for example, if the diisocyanate is a tolylene diisocyanate, the residue X will be

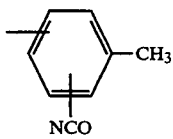

Isocyanates from which the group X can be derived include the di- and polyisocyanates listed above and the uretonimine-modified polyisocyanates made therefrom.

Such surface-active urethanes may be manufactured by reacting an alcohol of the formula $$RO(CH_2CH_2O)_nH$$

wherein R and n have the same meaning as for the above-mentioned surface-active or emulsifying agents, with an isocyanate having at least two isocyanate groups, there being used at least one molar proportion of isocyanate for each molar proportion of the alcohol. Preferably an excess of the isocyanate is used.

The reaction may be carried out by adding the alcohol to the isocyanate and allowing the reaction to proceed, preferably by heating the reaction mixture at a temperature of 50°–150° C. Alternatively the reaction can be carried out at lower temperatures e.g. 25° C. in the presence of a small amount of catalyst e.g. triethylene diamine.

In order to obtain emulsifiable polyisocyanates according to the present invention, the above type of surface-active agent may be prepared in situ in the uretonimine-modified polyisocyanate by reacting a small amount of the polyethylenoxy alcohol $$RO(CH_2CH_2O)_nH$$

with a large excess of the isocyanate.

A further type of surface-active agent which may be utilised is that described in British Patent Specification No. 1417276 which has the general formula

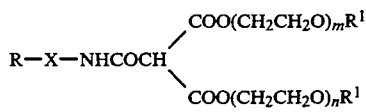

wherein X is the residue of an organic isocyanate, $R^1$ is an alkyl group of from 1 to 4 carbon atoms, n and m are integers such that m+n is at least 10 and R which is only present when X represents the residue of a diisocyanate or a higher functionality polyisocyanate, is an isocyanate group or a group of the formula

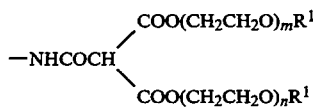

$R^1$ is preferably methyl and the sum of m and n is preferably between 20 and 80.

X may for example be the residue of any of the isocyanates listed earlier in this specification.

These surface-active agents or emulsifiers may be made by reaction of an isocyanate with a bis(alkoxy polyethylenoxy) ester of malonic acid, and may be if desired be prepared in situ in the isocyanate.

The amount of the non-ionic, surface-active agent in the polyisocyanate composition according to the present invention may range from 0.1 to 15 and preferably from 0.5 to 10% by weight calculated on the whole composition.

From the polyisocyanate compositions according to the present invention aqueous emulsions can be made, said emulsions exhibiting an improved stability and pot-life. The emulsions comprise 99 to 25 parts by weight of water and 1 to 75 parts by weight of the polyisocyanate composition according to the present invention. Such emulsions are made by combining the polyisocyanate composition and the water while and/or followed by thoroughly mixing at ambient temperature. The emulsion may further contain additives like pigments, fillers, antioxidants, resins and plasticisers.

The emulsions are useful as adhesives, coatings, sizing-agents of paper and as binders of lignocellulosic materials like wood-chips and straw.

The invention is illustrated by the following examples.

EXAMPLE 1

"Suprasec" MPR 4,4'-MDI ("Suprasec" is a trademark of Imperial Chemical Industries PLC) was modified into a uretonimine-modified polyisocyanate having a uretonimine-modified polyisocyanate content of 39.14% by weight by reaction at a temperature of 110° C. for 180 minutes in the presence of 8 parts per million of 1-phenyl, 3-methyl phospholene oxide as catalyst dissolved in cyclohexanone. The reaction was stopped by addition of thionyl chloride. To 42 parts by weight of this modified polyisocyanate was added 58 parts by weight of an MDI isomer mixture comprising 27.7% by weight of 2,4'-MDI and 72.3% by weight of 4,4'-MDI. The NCO value of the mixture obtained was 31% by weight. 96.63 parts by weight of this mixture was heated to 60° C., then 3.37 parts by weight of the monomethylether of polyethylene glycol having a molecular weight of 650 was added and allowed to react with the polyisocyanate under a nitrogen blanket for 150 minutes. Then the emulsifiable MDI obtained was cooled and stored at room temperature for 1 month.

"Suprasec" 1042 emulsifiable polyisocyanate which does not contain uretonimine-modified polyisocyanate and which is commercially obtainable from Imperial Chemical Industries PLC was also stored at room temperature following its preparation from polyisocyanate and the monomethylether of polyethylene glycol having a molecular weight of 650. Following the storage of the polyisocyanate composition according to the present invention and the "Suprasec" 1042 both polyisocyanates were added to water (weight ratio water:-polyisocyanate 3:1) and mixed for 30 seconds at 2000 rpm mixing speed at room temperature. Then the pot-life was determined. For the emulsified "Suprasec" 1042 polyisocyanate it was 3.5 hours and for the emulsified polyisocyanate composition according to the present invention it was more than 7 hours.

The pot-life was determined by placing the emulsified compositions in a water bath at 25° C. and by measuring the time after which the product started to gel or became solid by visual observation.

Further, it appeared that the emulsified "Suprasec" 1042 polyisocyanate showed a hard sediment after only a few minutes in the water bath. This layer was not re-emulsifiable. The emulsified polyisocyanate according to the present invention showed a softer layer after about 0.5 hour; this layer was re-emulsifiable.

Further the emulsifiable MDI according to the present invention showed a much lighter colour than "Suprasec" 1042 polyisocyanate, as did the emulsion prepared according to the present invention when compared with the corresponding emulsion prepared from "Suprasec" 1042.

EXAMPLE 2

"Suprasec" MPR 4,4'-MDI ("Suprasec" is a trademark of Imperial Chemical Industries PLC) was modified into a uretonimine-modified polyisocyanate having a uretonimine-modified polyisocyanate content of 40.36% by weight by reaction at a temperature of 110° C. for 180 minutes in the presence of 10 parts per million of 1-phenyl, 3-methyl phospholene oxide as catalyst dissolved in cyclohexanone. The reaction was stopped by addition of thionyl chloride. To 42.2 parts by weight of this modified polyisocyanate was added 57.8 parts by weight of an MDI isomer mixture comprising 58.3% by weight of 2,4'-MDI and 41.7% by weight of 4,4'-MDI. The NCO value of the mixture obtained was 31% by weight. 96.63 parts by weight of this mixture was heated to 60° C., then 3.37 parts by weight of the monomethylether of polyethylene glycol having a molecular weight of 650 was added and allowed to react with the polyisocyanate under a nitrogen blanket for 150 minutes. Then the emulsifiable MDI obtained was cooled and stored at room temperature for 1 month.

Following storage of the polyisocyanate composition, an aqueous emulsion was prepared and the pot-life was determined according to the methods described in Example 1. The pot-life was found to be 6 hours.

EXAMPLE 3

"Suprasec" MPR 4,4'-MDI ("Suprasec" is a trademark of Imperial Chemical Industries PLC) was modified into a uretonimine-modified polyisocyanate having a uretonimine-modified polyisocyanate content of 40.36% by weight by reaction at a temperature of 110° C. for 180 minutes in the presence of 8 parts per million of 1-phenyl, 3-methyl phospholene oxide as catalyst dissolved in cyclohexanone. The reaction was stopped by addition of thionyl chloride. To 42.2 parts by weight of this modified polyisocyanate was added 57.8 parts by weight of an MDI isomer mixture comprising 44.6% by weight of 2,4'-MDI and 55.4% by weight of 4,4'-MDI. The NCO value of the mixture obtained was 30.9 by weight. 96.63 parts by weight of this mixture was heated to 60° C., then 3.37 parts by weight of the monomethylether of polyethylene glycol having a molecular weight of 650 was added and allowed to react with the polyisocyanate under a nitrogen blanket for 150 minutes. Then the emulsifiable MDI obtained was cooled and stored at room temperature for 1 month.

Following storage of the polyisocyanate composition, an aqueous emulsion was prepared and its pot-life determined according to the procedures described in Example 1. The pot-life was found to be 5 hours.

We claim:

1. Emulsifiable-polyisocyanate composition having a uretonimine-modified isocyanate content of from 4% to 75% by weight, calculated on the whole composition, comprising a uretonimine-modified polyisocyanate and a non-ionic surface-active agent devoid of hydroxy, amino and carboxylic acid groups.

2. Polyisocyanate composition according to claim 1 having a uretonimine-modified isocyanate content of from 5% to 50% by weight, calculated on the whole composition.

3. Polyisocyanate composition according to claim 1 wherein the NCO content is from 20% to 32%, calculated on the whole composition.

4. Polyisocyanate composition according to claim 1 wherein the polyisocyanate is an aromatic diisocyanate or an aromatic polyisocyanate of higher functionality.

5. Polyisocyanate composition according to claim 4 wherein the polyisocyanate is selected from the group consisting of diphenylmethane-4,4'-diisocyanate, diphenylmethane-2,4'-diisocyanate and isomer mixtures thereof.

6. Polyisocyanate composition according to claim 5 wherein the polyisocyanate is an isomer mixture of diphenylmethane-4,4'-diisocyanate and diphenylmethane-2,4'-diisocyanate containing a high amount of the 2,4'-isomer.

7. Polyisocyanate composition according to claim 6 wherein the polyisocyanate contains at least 15% of the 2,4'-isomer.

8. Polyisocyanate composition according to claim 7 wherein the polyisocyanate contains 15% to 40% of the 2,4'-isomer.

9. Polyisocyanate composition according to claim 1 wherein the amount of the non-ionic surface-active agent is from 0.1% to 15% by weight calculated on the whole composition.

10. Polyisocyanate composition according to claim 1 wherein the non-ionic surface-active agent is the reaction product of a diisocyanate or a higher functionality polyisocyanate with a monoalkyl ether of a polyalkylene glycol, having the formula

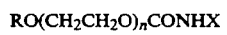

RO(CH$_2$CH$_2$O)$_n$CONHX wherein R is C$_{1-4}$ alkyl, n is an integer such that the compound contains an average of at least 5 oxyethylene groups and X is the residue of a di- or polyisocyanate and contains at least one free isocyanate group.

11. Polyisocyanate composition according to claim 10 wherein n represents an average of from 5 to 120.

12. Polyisocyanate composition according to claim 10 wherein the polyisocyanate is an isomer mixture of diphenylmethane-4,4'-diisocyanate and diphenylmethane-2,4'-diisocyanate containing at least 15% of the 2,4'-isomer and wherein the amount of the non-ionic surface-active agent is from 0.1% to 15% by weight calculated on the whole composition.

13. Polyisocyanate composition according to claim 12 wherein the polyisocyanate contains from 15% to 40% of the 2,4'-isomer.

14. Polyisocyanate composition according to claim 13 having a uretonimine-modified isocyanate content of from 5% to 50%.

15. Aqueous emulsion of a polyisocyanate composition according to claim 1.

16. Aqueous emulsion of a polyisocyanate composition according to claim 10.

17. Aqueous emulsion according to claim 15 comprising from 99 to 25 parts by weight of water and from 1 to 75 parts by weight of the polyisocyanate composition.

18. Aqueous emulsion according to claim 16 comprising from 99 to 25 parts by weight of water and from 1 to 75 parts by weight of the polyisocyanate composition.

* * * * *